(12) United States Patent
Murahashi et al.

(10) Patent No.: US 10,108,857 B2
(45) Date of Patent: Oct. 23, 2018

(54) IMAGE READING APPARATUS, IMAGE CORRECTING METHOD

(71) Applicant: SEIKO EPSON CORPORATION, Tokyo (JP)

(72) Inventors: Kenichi Murahashi, Kitakyushu (JP); Masatomo Kanamitsu, Kitakyushu (JP); Wataru Beppu, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/607,214

(22) Filed: May 26, 2017

(65) Prior Publication Data

US 2017/0344819 A1   Nov. 30, 2017

(30) Foreign Application Priority Data

May 30, 2016   (JP) .................................. 2016-107082

(51) Int. Cl.
*G06K 7/10* (2006.01)
*G06K 9/00* (2006.01)
*H04N 1/04* (2006.01)
*H04N 1/10* (2006.01)

(52) U.S. Cl.
CPC .......... *G06K 9/00442* (2013.01); *G06K 7/10* (2013.01); *H04N 1/04* (2013.01); *H04N 1/10* (2013.01)

(58) Field of Classification Search
CPC .................................................. G06K 9/3275
USPC .......... 235/470; 358/474, 498, 475; 382/108
See application file for complete search history.

(56) References Cited

U.S. PATENT DOCUMENTS

| 2007/0127087 | A1 | 6/2007 | Nabemoto et al. | |
| 2007/0171488 | A1* | 7/2007 | Chen | H04N 1/00681 358/498 |
| 2010/0142012 | A1* | 6/2010 | Yamamoto | G06K 9/3275 358/498 |
| 2011/0013238 | A1* | 1/2011 | Kamio | H04N 1/00002 358/475 |
| 2011/0210507 | A1* | 9/2011 | Nagura | B65H 5/062 271/267 |

FOREIGN PATENT DOCUMENTS

JP   2005-260387   9/2005

* cited by examiner

*Primary Examiner* — Allyson Trail
(74) *Attorney, Agent, or Firm* — Workman Nydegger

(57) ABSTRACT

An image reading apparatus is configured to read an image of each of documents transported in a transport path from an upstream side to a downstream side in a transport direction, acquires a correction factor for correcting a read image on the basis of a fed document number, and corrects the length of the read image in the transport direction on the basis of the correction factor which has been acquired.

9 Claims, 6 Drawing Sheets

IMAGE READING APPARATUS, IMAGE CORRECTING METHOD

BACKGROUND

1. Technical Field

The present invention relates to an image reading apparatus, such as a scanner, configured to read an image of a document and an image correcting method of the image reading apparatus.

2. Related Art

An image reading apparatus has been known which includes a pick roller configured to feed documents mounted on a paper sheet mount table (mount unit) to a transport path and a line sensor (reader) configured to read an image of each of the documents which are fed (for example, JP-A-2005-260387).

Such an image reading apparatus includes a separating pad configured to generate frictional force between the separating pad and documents, and when the documents are delivered from the paper sheet mount table to the transport path by the pick roller, the documents are separated one by one.

However, the separating pad wears down due to transport of the documents, which may reduce the frictional force between the separating pad and the documents. Note that the frictional force between the separating pad and the documents acts in a direction opposite to a direction in which the documents are delivered. Therefore, when the frictional force decreases, the speed at which the documents pass through the line sensor increases, thereby reducing the length of an image read by the line sensor.

SUMMARY

An advantage of some aspects of the invention is that an image reading apparatus which enables reduced variations in length of an image read by a reader and an image correcting method are provided.

Hereinafter, means of the invention and operation effects thereof will be described.

An image reading apparatus of an aspect of the invention includes a feeder configured to feed documents while providing frictional force in a direction opposite to a transport direction from a mount unit on which the documents are mounted toward a transport path; a storage configured to store a fed document number of the documents fed by the feeder; a reader configured to read an image of each of the documents transported in the transport path from an upstream side to a downstream side in the transport direction; a correction factor acquisition unit configured to acquire, based on the fed document number, a correction factor for correcting a read image read by the reader; and a correction unit configured to correct a length of the read image in the transport direction on the basis of the correction factor.

The feeder wears down due to feeding of the documents, thereby varying the frictional force between the feeder and the documents, which may change the speed at which the documents pass through the reader. However, with this configuration, the correction factor acquisition unit acquires a correction factor based on the fed document number of the documents fed by the feeder, and the correction unit corrects the image on the basis of the correction factor. Therefore, variations in the length of the image read by the reader can be reduced.

In the image reading apparatus, the fed document number stored in the storage is preferably reset when the feeder is replaced.

When the feeder which is worn is replaced, the frictional force increases between the feeder after the replacement and the documents. However, with this configuration, the fed document number is reset when the feeder is replaced, which enables the correction factor acquisition unit to acquire a correction factor according to the feeder after the replacement.

In the image reading apparatus, the correction factor acquisition unit preferably acquires the correction factor for each of jobs.

With this configuration, the correction factor acquisition unit acquires the correction factor for each of the jobs, which enables correction of the image with a correction factor optimal for each job.

The image reading apparatus preferably further includes: a transport roller configured to transport the documents fed by the feeder from the upstream side to the downstream side in the transport direction, wherein the storage further stores a rotational number of the transport roller, and the correction factor acquisition unit acquires the correction factor also on the basis of the rotational number.

Due to transport of the documents, the transport roller wears down and the diameter of the transport roller decreases, which may reduce the transport distance per rotation of the transport roller. However, with this configuration, since the correction factor acquisition unit acquires the correction factor also on the basis of the rotational number of the transport roller, variations in the length of the image read by the reader can be further reduced.

In the image reading apparatus, the storage preferably further stores a specific adjustment value which is specific to the image reading apparatus, and the correction factor acquisition unit preferably acquires the correction factor also on the basis of the specific adjustment value.

Even when image reading apparatuses are image reading apparatuses of the same model, the speed at which documents pass through the reader may be different for each image reading apparatus due to variations in components, assembly errors, etc. However, with this configuration, the correction factor acquisition unit acquires the correction factor also on the basis of the specific adjustment value which is specific to each image reading apparatus, and therefore, variations in the length of the image read by the reader can be further reduced.

The image reading apparatus preferably further includes: an adjustment value acquisition unit configured to acquire a variable adjustment value which is variable, wherein the correction factor acquisition unit acquires the correction factor also on the basis of the variable adjustment value.

With this configuration, the adjustment value acquisition unit acquires the variable adjustment value which is varied by, for example, a user. Then, the correction factor acquisition unit acquires the correction factor also on the basis of the variable adjustment value, and therefore, the length of the image read by the reader can be adjusted.

The image reading apparatus preferably further includes an output unit configured to output correction information based on the correction factor.

With this configuration, the output unit outputs the correction information, and therefore, for example, by displaying the correction information which is output on a display unit, it is possible to notify a user of whether or not the image has been corrected.

Moreover, an image correcting method of an aspect of the invention is an image correcting method of an image reading apparatus including: a feeder configured to feed documents while providing frictional force in a direction opposite to a transport direction from a mount unit on which the documents are mountable toward a transport path; and a reader configured to read an image of each of the documents transported in the transport path from an upstream side to a downstream side in the transport direction, the image correcting method including: causing the feeder to feed the documents; storing a fed document number of the documents which are fed; causing the reader to read the image of each of the documents, acquiring, based on the fed document number, a correction factor for correcting a read image read by the reader; and correcting a length of the read image in the transport direction on the basis of the correction factor.

This configuration provides an advantage similar to the advantage provided by the image reading apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of an image reading apparatus will be described below with reference to the drawings. Note that the image reading apparatus of the present embodiment is, for example, a sheet-feed scanner which includes a fixed reader configured to read an image of a document which is transported.

Figure 1:
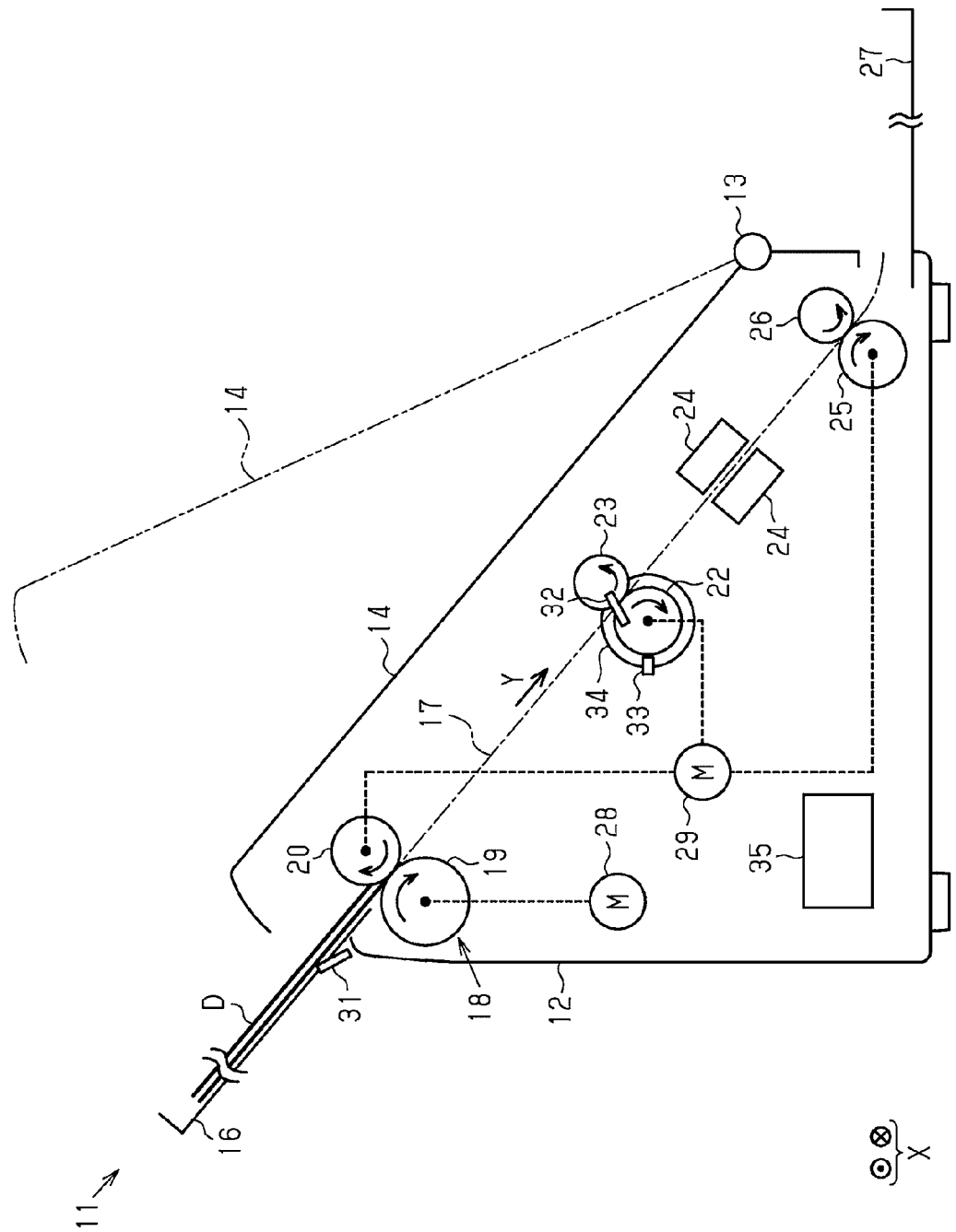
FIG. 1 is a schematic view illustrating an embodiment of an image reading apparatus.

As illustrated in FIG. 1, an image reading apparatus 11 includes: a body unit 12 having a substantially trapezoidal box shape in a side view; and a pivoting unit 14 pivotable about a shaft 13 provided on the body unit 12. That is, the pivoting unit 14 pivots between a closed position indicated by a solid line in FIG. 1 and an open position indicated by a long dashed double-short dashed line in FIG. 1.

The image reading apparatus 11 further includes: a mount unit 16 on which a plurality of documents D in a stacked state are mountable; and a feeder 18 configured to feed the documents D from the mount unit 16 while providing frictional force in a direction opposite to a transport direction Y toward a transport path 17 indicated by a long dashed short dashed line in FIG. 1. The feeder 18 includes: a feed roller 19 configured to feed the documents D from the mount unit 16 toward the transport path 17; and a frictional force imparting unit 20 configured to generate frictional force between the frictional force imparting unit 20 and the documents D fed by the feed roller 19. Note that the frictional force imparting unit 20 of the present embodiment is a separating roller configured to rotate in contact with the document D so as to separate the documents D from each other. The feeder 18 is provided to be replaceable by positioning the pivoting unit 14 in the open position. That is, the feed roller 19 is detachably provided on the body unit 12, and the frictional force imparting unit 20 is detachably provided on the pivoting unit 14.

Moreover, at a position downstream of the feeder 18 in the transport direction Y, a transport roller 22 configured to transport the documents D and a transport driven roller 23 configured to rotate by being driven along with the rotation of the transport roller 22 are provided such that the transport path 17 is sandwiched therebetween. At a position downstream of the transport roller 22 in the transport direction Y, at least one reader 24 (in the present embodiment, a pair of readers 24) configured to read an image of each of the documents D is provided on both sides of the transport path 17 so as to extend in a main scan direction (width direction X).

That is, the transport roller 22 transports the document D fed by the feeder 18 from an upstream side to a downstream side in the transport direction Y. Then, the reader 24 provided on the body unit 12 reads an image on a first side (for example, back surface) of the document D transported in the transport path 17 from the upstream side to the downstream side in the transport direction Y. Moreover, the reader 24 provided on the body unit 14 reads an image on a second side (for example, front surface) of the document D transported in the transport path 17 from the upstream side to the downstream side in the transport direction Y.

At a downstream side of the readers 24 in the transport direction Y, a discharge roller 25 configured to discharge the document D from the body unit 12, a discharge driven roller 26 configured to rotate by being driven along with the rotation of the discharge roller 25, and a discharge unit 27 configured to discharge the document D are provided.

The image reading apparatus 11 further includes: a feed motor 28 serving as a drive source for rotating the feed roller 19; and a transport motor 29 serving as a drive source for rotating the transport roller 22. Note that the transport motor 29 is also connected to the frictional force imparting unit 20 and the discharge roller 25 and also rotates the frictional force imparting unit 20 and the discharge roller 25.

Moreover, the feed roller 19, the transport roller 22, and the discharge roller 25 rotate forward along with driving of the feed motor 28 and the transport motor 29 so as to transport the document D from the upstream side to the downstream side in the transport direction Y. The frictional force imparting unit 20 rotates reversely along with driving of the transport motor 29 so as to give to the document D frictional force in a direction opposite to the transport direction Y. The transport roller 22 and the discharge roller 25 rotate faster than the feed roller 19, and the transport speed of the document D by the transport roller 22 is faster than the feed speed of the document D by the feed roller 19.

The image reading apparatus 11 further includes: a document detector 31 capable of detecting the document D mounted on the mount unit 16; a transport detector 32 capable of detecting the document D which is transported; and a rotation detector 33 configured to detect rotation of the transport roller 22. Note that the transport detector 32 is provided substantially at the same position as the transport roller 22 in the transport direction Y. The document detector 31 and the transport detector 32 of the present embodiment are, for example, contact sensors having levers, and when the document D pushes against the levers, the document detector 31 and the transport detector 32 determine that the document D is present. Moreover, the rotation detector 33 of the present embodiment is, for example, a rotary encoder and detects a value of an encoder scale 34 which rotates together with the transport roller 22. The image reading apparatus 11 further includes a controller 35 configured to comprehensively control driving of each of mechanisms such as the feed motor 28 and the transport motor 29 of the image reading apparatus 11.

Next, the electrical structure of the image reading apparatus 11 will be described.

Figure 2:
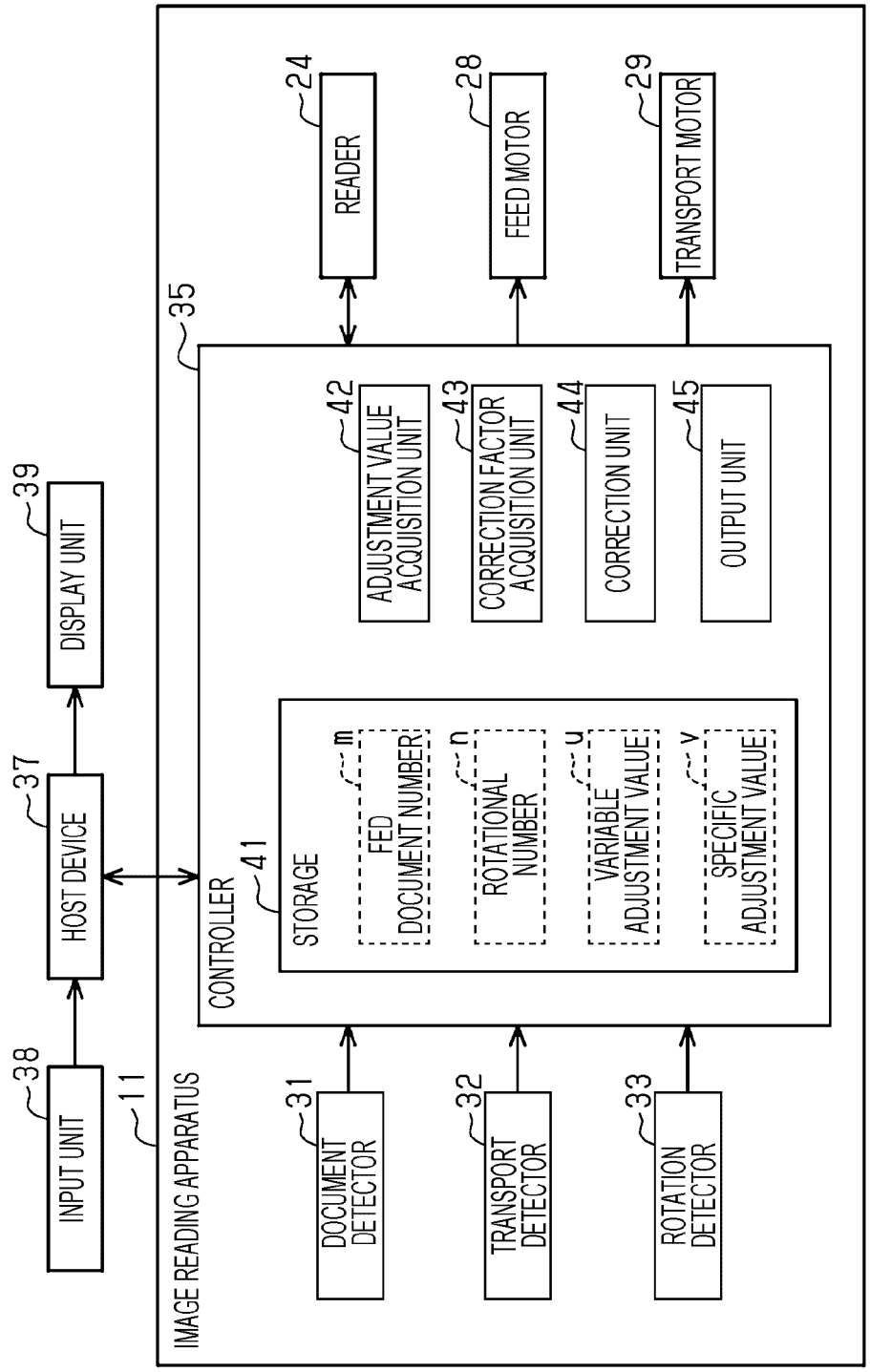
FIG. 2 is a block diagram illustrating a controller.

As illustrated in FIG. 2, to the image reading apparatus 11, a host device 37 configured as, for example, a personal computer or a personal digital assistant is connected. In the host device 37, a read driver configured as software is installed. The host device 37 outputs, to the image reading apparatus 11, a job of reading an image of the document D based on information input from an input unit 38 operated by a user. The host device 37 displays information input via the input unit 38 and/or information acquired from the image reading apparatus 11 on a display unit 39 such as a display.

Moreover, the controller 35 included in the image reading apparatus 11 includes: a storage 41 configured to store a fed document number m which is the number of the documents D fed by the feeder 18 and a rotational number n of the transport roller 22; and an adjustment value acquisition unit 42 configured to acquire a variable adjustment value u output from the host device 37. Note that the variable adjustment value u is variable by an operation performed on, for example, the input unit 38, and the variable adjustment value u acquired by the adjustment value acquisition unit 42 is stored in the storage 41.

Even when image reading apparatuses 11 are image reading apparatuses of the same model, variations in components, assembly errors, etc. may occur, and the transport distance of the document D transported by one rotation of the transport roller 22 may also be different for each image reading apparatus 11. Therefore, for example, a worker who assembles and adjusts the image reading apparatuses 11 measures the transport distance of the document D, and based on the measurement result, a specific adjustment value v which is specific to each of the image reading apparatuses 11 is set and stored in the storage 41.

The controller 35 further includes: a correction factor acquisition unit 43 configured to acquire a correction factor for correcting a read image read by the reader 24; a correction unit 44 configured to correct the length of the read image in the transport direction Y on the basis of the correction factor; and an output unit 45 configured to output correction information based on the correction factor. Note that the correction factor acquisition unit 43 acquires the correction factor based on the fed document number m, the rotational number n of the transport roller 22, the variable adjustment value u, and the specific adjustment value v stored in the storage 41.

Next, with reference to the flowchart shown in FIG. 3, an image correcting method for correcting a read image read by the reader 24 will be described based on an image correction routine. Note that this image correction routine is executed at a timing at which the variable adjustment value u is set by the host device 37 and a job of reading an image is started.

Figure 3:
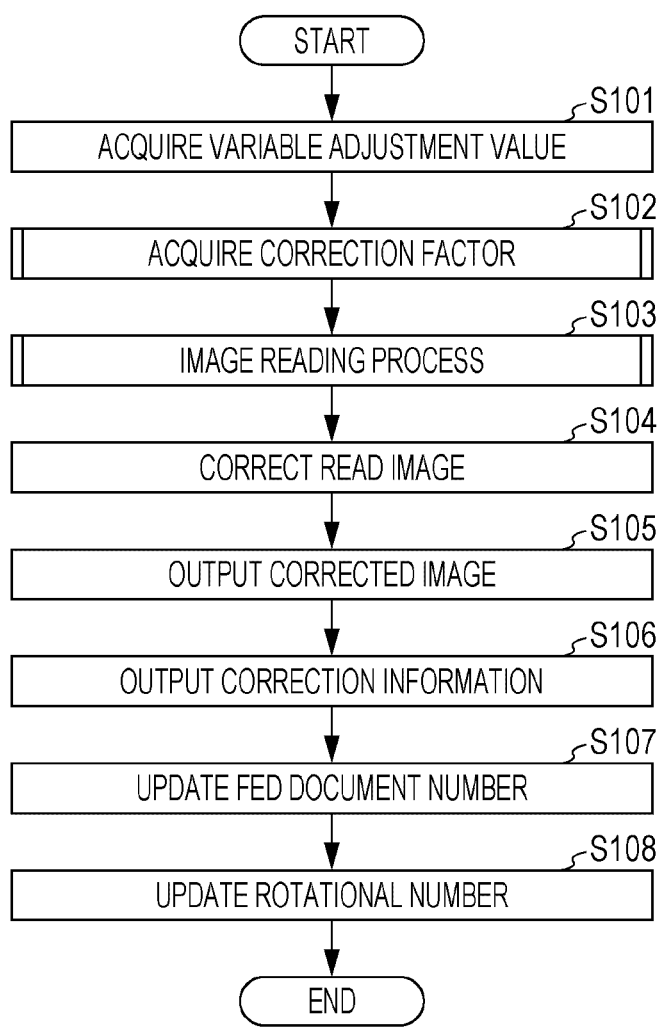
FIG. 3 is a flowchart illustrating an image correction routine.

As illustrated in FIG. 3, in step S101, the adjustment value acquisition unit 42 acquires the variable adjustment value u output together with the job from the host device 37 and stores the variable adjustment value u in the storage 41. Then, in step S102, the controller 35 executes a correction factor acquisition routine (see FIG. 4) and acquires a correction factor based on at least the fed document number m (correction factor acquisition process). Moreover, in step S103, the controller 35 executes an image reading process routine (see FIG. 5) so as to cause the reader 24 to read an image of the document D and acquires the read image read by the reader 24 (reading step).

Moreover, in step S104, the correction unit 44 corrects the length of the read image in the transport direction Y on the basis of the correction factor, thereby generating a corrected image (correction step). Then, in step S105, the output unit 45 outputs the corrected image to the host device 37. In step S106, the output unit 45 further outputs correction information based on the correction factor to the host device 37. Subsequently, in step S107, the controller 35 adds the number of documents D fed based on the job to the fed document number m stored in the storage 41 to update the fed document number m, thereby storing a fed document number m of the documents D which have been fed (storage step). Moreover, in step S108, the controller 35 adds the number of rotations of the transport roller 22 rotated based on the job to the rotational number n stored in the storage 41 to update the rotational number n, thereby storing a rotational number n of the transport roller 22. Then, the controller 35 terminates the image correction routine.

Next, with reference to the flowchart shown in FIG. 4, the correction factor acquisition routine in step S102 (see FIG. 3) in which the correction factor acquisition unit 43 acquires the correction factor will be described.

Figure 4:
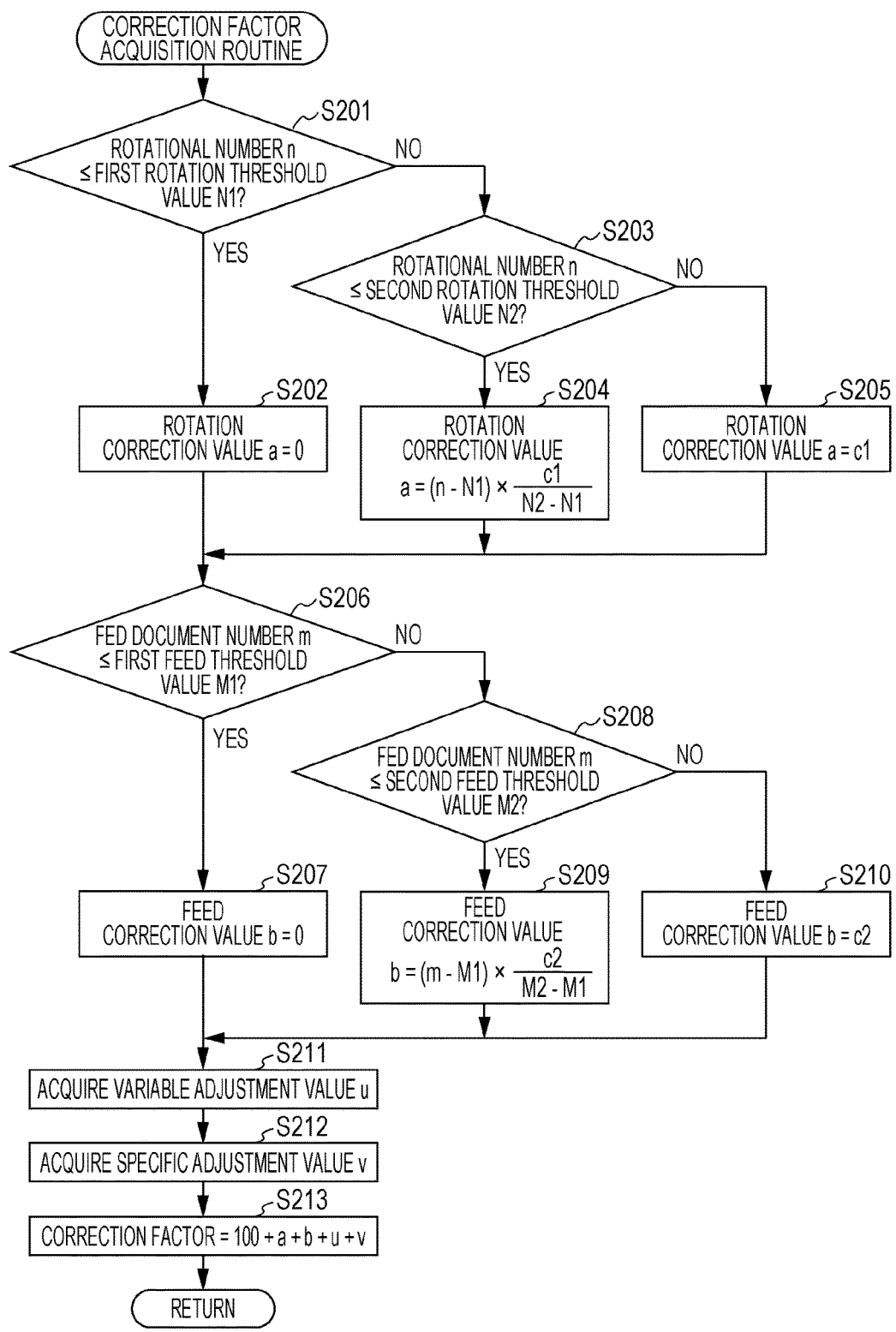
FIG. 4 is a flowchart illustrating a correction factor acquisition routine.

As illustrated in FIG. 4, in step S201, the correction factor acquisition unit 43 determines whether or not the rotational number n stored in the storage 41 is less than or equal to a first rotation threshold value N1. Then, if the rotational number n is less than or equal to the first rotation threshold value N1 ($n \leq N1$) (step S201: YES), the correction factor acquisition unit 43 sets a rotation correction value a to 0 in step S202. In contrast, if the rotational number n is greater than the first rotation threshold value N1 ($n > N1$) (step S201: NO), the correction factor acquisition unit 43 determines whether or not the rotational number n is less than or equal to a second rotation threshold value N2 in step S203.

That is, if the rotational number n is greater than the first rotation threshold value N1 and less than or equal to the second rotation threshold value N2 ($N1 < n \leq N2$) (step S203: YES), the correction factor acquisition unit 43 sets the rotation correction value a based on Expression (1) below in step S204.

$$\text{ROTATION CORRECTION VALUE } a = (n - N1) \times \frac{c1}{N2 - N1} [\%] \quad (1)$$

Note that the first rotation threshold value N1 (for example, 3,000), the second rotation threshold value N2 (for example, 7,000,000), and a first constant c1 are values set for each of models based on experiments and/or measurements. Moreover, the first constant c1 is set to a negative value less than 0, and the rotation correction value a is a value less than or equal to 0.

Specifically, as the number of documents D transported by the transport roller 22 increases, the transport roller 22 wears down and the diameter of the transport roller 22 decreases, which reduces the transport distance per rotation of the transport roller 22. That is, while the transport roller 22 is transporting the documents D, the transport force of the transport roller 22 for transporting the documents D changes. In other words, as the rotational number n increases, a transport speed at which the documents D are transported decreases, and therefore, the time required for each document D to pass through the reader 24 increases, which increases the length of the read image in the transport direction Y. The first constant c1 is calculated from a proportion of the length of an image read in a terminal state after reading a maximum durability number of (for example, 1,000,000 sheets of) documents D expected in the image reading apparatus 11 to the length of an image read in an initial state, provided that the length of the image read in the initial state is defined as 100%. For example, if reducing the length of the image read in the terminal state to 98% renders the length of the image read in the terminal state equal to the length of the image read in the initial state, the first constant c1=98−100=−2. Note that the first constant c1 is preferably a value having about five significant digits (four digits after the decimal point).

Moreover, the first rotation threshold value N1 is a value at which the read image starts to be affected. The second rotation threshold value N2 is the total rotational number of the transport roller 22 in the case of reading the maximum durability number of (for example, 1,000,000 sheets of) documents D expected in the image reading apparatus 11.

In step S203, if the rotational number n is greater than the second rotation threshold value N2 (n>N2) (step S203: NO), the correction factor acquisition unit 43 sets the rotation correction value a to the first constant c1 in step S205.

Subsequently, in step S206, the correction factor acquisition unit 43 determines whether or not the fed document number m stored in the storage 41 is less than or equal to a first feed threshold value M1. If the fed document number m is less than or equal to the first feed threshold value M1 (m≤M1) (step S206: YES), the correction factor acquisition unit 43 sets a feed correction value b to 0 in step S207. In contrast, if the fed document number m is greater than the first feed threshold value M1 (m>M1) (step S206: NO), the correction factor acquisition unit 43 determines whether or not the fed document number m is less than or equal to a second feed threshold value M2 in step S208.

That is, if the fed document number m is greater than the first feed threshold value M1 and less than or equal to the second feed threshold value M2 (M1<m≤M2) (step S208: YES), the correction factor acquisition unit 43 sets the feed correction value b based on Expression (2) below in step S209.

$$\text{FEED CORRECTION VALUE } b = (m - M1) \times \frac{c2}{M2 - M1} \, [\%] \quad (2)$$

Note that the first feed threshold value M1 (for example, 100), the second feed threshold value M2 (for example, 150,000), and a second constant c2 are values set for each of models based on experiments and/or measurements. Moreover, the second constant c2 is set to a positive value greater than 0, and the feed correction value b is a value greater than 0.

Specifically, as the number of documents D fed by the feeder 18 increases, the frictional force imparting unit 20 wears down, thereby reducing the frictional force between the frictional force imparting unit 20 and the documents D, which increases the transport speed at which the documents D are transported by the transport roller 22. Therefore, as the fed document number m increases, the time required for each document D to pass through the reader 24 decreases, thereby reducing the length of the read image in the transport direction Y. The second constant c2 is calculated from a proportion of the length of an image read in a replacement-requiring state after reading an expected maximum durability number of (for example, 150,000 sheets of) documents D of the feeder 18 to the length of an image read in an initial state, provided that the length of the image read in the initial state is defined as 100%. Note that the maximum durability number of the feeder 18 is a number as an indicator for replacement of the feeder 18.

For example, if increasing the length of the image read in the replacement-requiring state to 100.3% renders the length of the image read in the replacement-requiring state equal to the length of the image read in the initial state, the length of the second constant c2=100.3−100=0.3%. Note that the second constant c2 is preferably a value having about five significant digits (four digits after the decimal point). Moreover, the first feed threshold value M1 is a value at which the read image starts to be affected. The second feed threshold value M2 is the expected maximum durability number of (for example, 150,000 sheets of) documents D of the feeder 18.

In step S208, if the fed document number m is greater than the second feed threshold value M2 (m>M2) (step S208: NO), the correction factor acquisition unit 43 sets the feed correction value b to the second constant c2 in step S210.

Moreover, in step S211, the correction factor acquisition unit 43 acquires the variable adjustment value u stored in the storage 41, and in step S212, the correction factor acquisition unit 43 acquires the specific adjustment value v stored in the storage 41.

Then, in step S213, the correction factor acquisition unit 43 adds the rotation correction value a, the feed correction value b, the variable adjustment value u, and the specific adjustment value v to 100%, thereby calculating the correction factor. For example, when the rotation correction value a is −2%, the feed correction value b is 0.3%, the specific adjustment value v is 1%, and the variable adjustment value u is 3%, the correction factor is 100+(−2)+0.3+1+3=102.3%.

Next, with reference to the flowchart shown in FIG. 5, the image reading process routine in step S103 (see FIG. 3) will be described.

Figure 5:
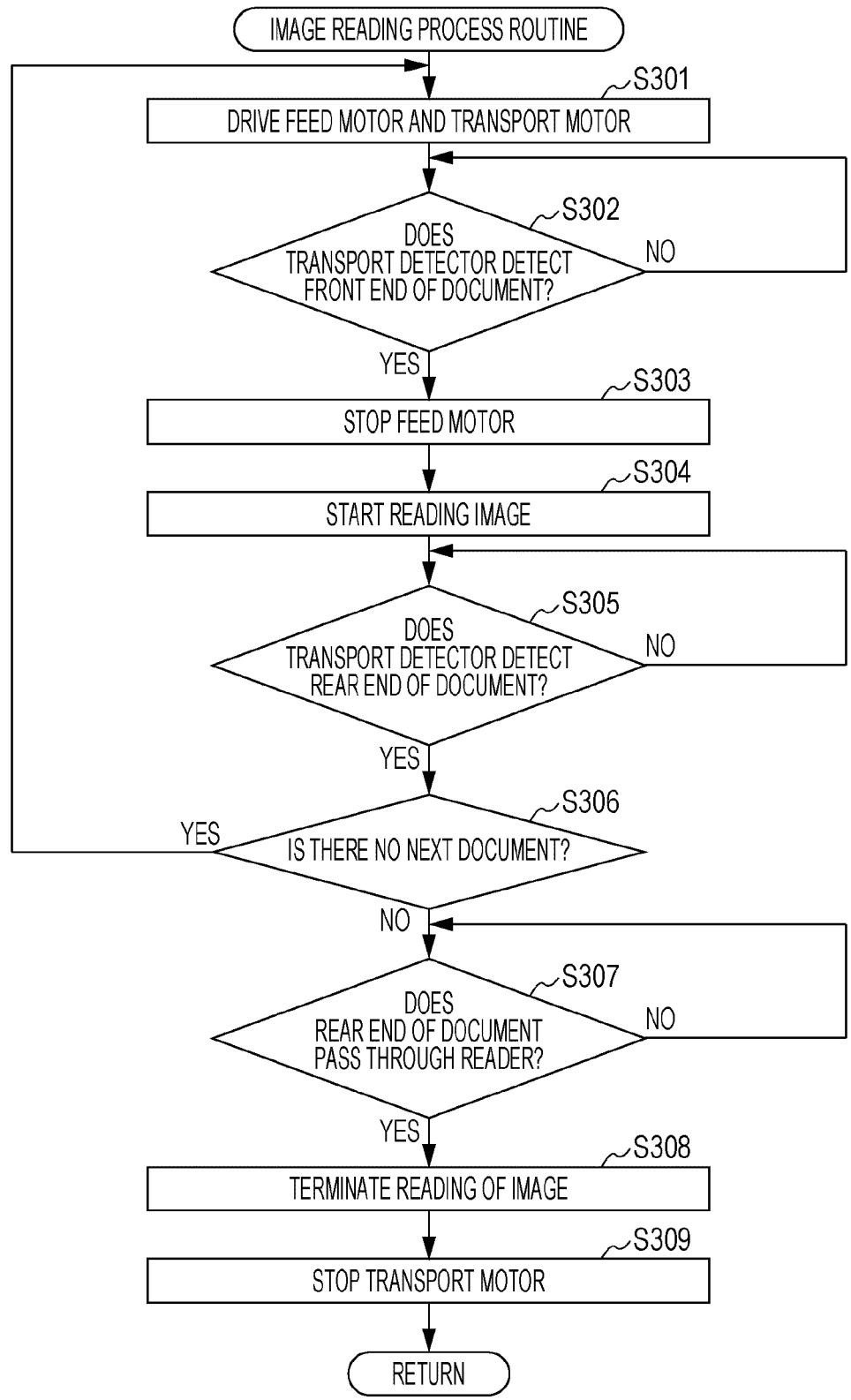
FIG. 5 is a flowchart illustrating an image reading process routine.

As illustrated in FIG. 5, in step S301, the controller 35 drives the feed motor 28 and the transport motor 29, thereby causing the feeder 18 to feed the document D (feeding step). Then, in step S302, the controller 35 determines whether or not the transport detector 32 detects the front end of the document D. If the transport detector 32 does not detect the document D (step S302: NO), the controller 35 is on stand-by while driving the feed motor 28 and the transport motor 29.

If the transport detector 32 detects the document D, the controller 35 determines that the front end of the document D has been transported to the transport detector 32 (step S302: YES), and in step S303, the controller 35 stops the feed motor 28. Moreover, in step S304, the controller 35 causes the reader 24 to start reading the image, and subsequently, in step S305, the controller 35 determines whether or not the transport detector 32 detects the rear end of the document D.

That is, if the transport detector 32 detects the document D, the controller 35 determines that the rear end of the document D has not passed through the transport detector 32, and the controller 35 is on stand-by (step S305: NO). Then, when the detection result of the transport detector 32 changes from a state in which the document D is detected to a state in which the document D is no longer detected, the controller 35 determines that the transport detector 32 has detected the rear end of the document D (step S305: YES).

In step S306, the controller 35 determines whether or not a next document D is mounted on the mount unit 16 based on the detection result of the document detector 31. Then, if the next document D is mounted on the mount unit 16 (step S306: YES), the process proceeds to step S301. In contrast, if the next document D is not mounted on the mount unit 16 (step S306: NO), the controller 35 determines whether or not the rear end of the document D has passed through the reader 24 in step S307.

That is, if the rotational number of the transport roller 22 after the transport detector 32 has detected the rear end of the document D is less than a prescribed rotational number, the controller 35 determines that the rear end has not passed through the reader 24, and the controller 35 is on stand-by (step S307: NO). Then, if the rotational number of the transport roller 22 after the transport detector 32 has detected the rear end of the document D is greater than the prescribed rotational number, the controller 35 determines that the rear end of the document D has passed through the reader 24 (step S307: YES).

Then, in step S308, the controller 35 causes the reader 24 to terminate reading of the image, and in step S309, the controller 35 stops the transport motor 29 in order to terminate the image reading process routine.

Next, operation in a case of replacing the feeder 18 will be described.

As illustrated in FIG. 1, a user positions the pivoting unit 14 in an open position, replaces the feed roller 19 and the frictional force imparting unit 20, and then moves the pivoting unit 14 back to a closed position. Moreover, when a user operates the input unit 38 and inputs that the feeder 18 has been replaced, the controller 35 resets the fed document number m stored in the storage 41. That is, the fed document number m stored in the storage 41 is reset when the feeder 18 is replaced.

Next, operation in a case of reading a document D by the image reading apparatus 11 and correcting a read image which has been read will be described.

Figure 6:
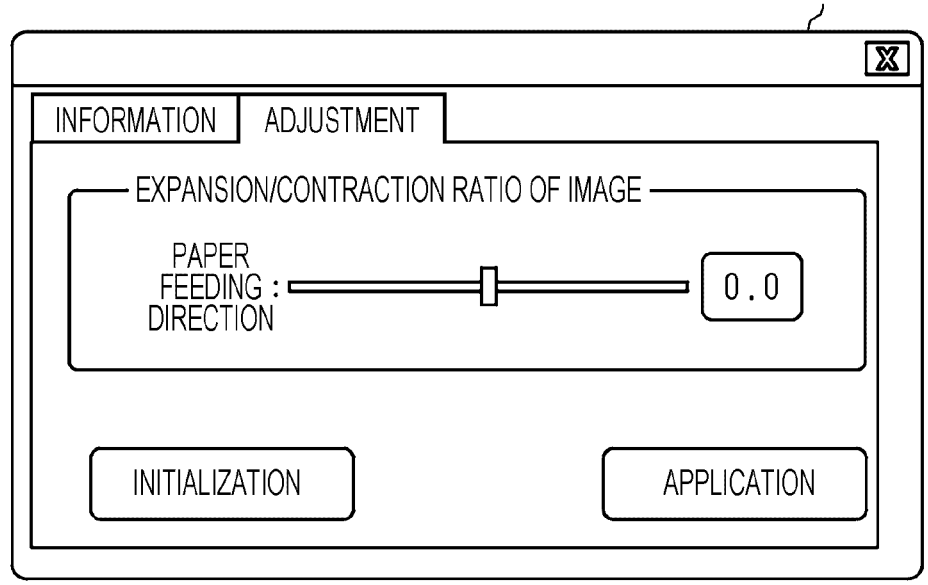
FIG. 6 is a schematic view illustrating a setting screen.
Figure 7:
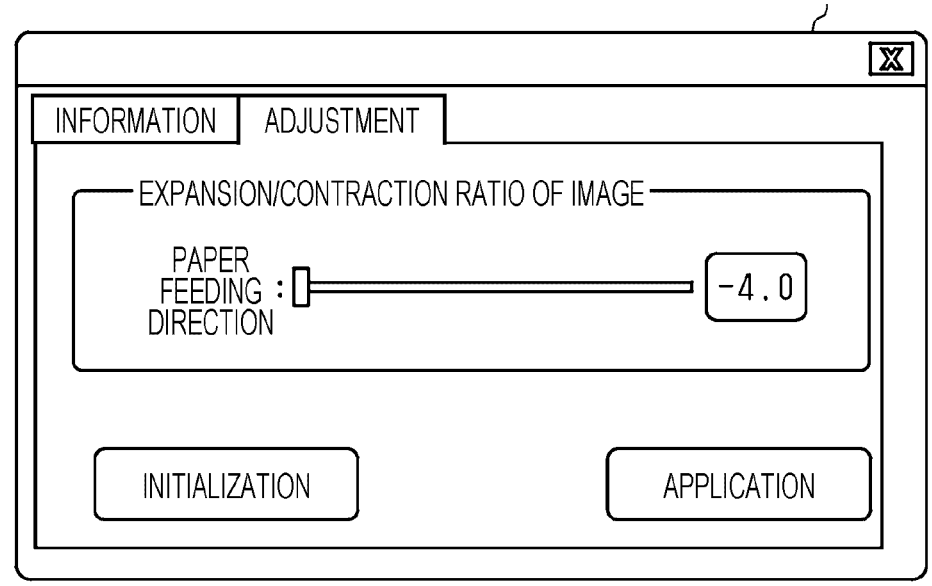
FIG. 7 is a schematic view illustrating a setting screen.

As illustrated in FIGS. 6 and 7, the host device 37 displays a setting screen 47 for setting reading conditions on the display unit 39. Then, a user operates the input unit 38 so as to input conditions such as an expansion/contraction ratio (variable adjustment value u) of the image to start reading the image. Note that the variable adjustment value u may be set, for example, within a range from −4.0% to 4.0%.

Then, when jobs are input from the host device 37, the correction factor acquisition unit 43 acquires a correction factor for each of the jobs. Moreover, the controller 35 drives the feed motor 28 and the transport motor 29, thereby feeding and transporting the document D.

If the transport detector 32 detects the front end of the document D, the controller 35 stops the feed motor 28. That is, since the transport motor 29 is being driven, the transport roller 22 rotates and transports the document D, and the feed roller 19 co-rotates with the document D transported by the transport roller 22. Meanwhile, the frictional force imparting unit 20 reversely rotates so as to continue providing frictional force to the document D. Then, the document D is transported by the transport roller 22 and the discharge roller 25 to a downstream side in the transport direction Y, passes through the reader 24, and is discharged to the discharge unit 27. Note that the reader 24 reads the image of the document D at a timing at which the document D passes through the reader 24.

The read image read by the reader 24 is temporarily stored in the storage 41. Then, the correction unit 44 corrects the length of the read image in the transport direction Y with the correction factor. That is, the correction unit 44 corrects the read image by expanding or contracting the read image in the transport direction Y by, for example, a bicubic method. Specifically, for example, when the correction factor is 102.3%, the correction unit 44 expands the length of the read image by a factor of 1.023. Then, the output unit 45 outputs a corrected image generated by the correction unit 44 and correction information based on the correction factor to the host device 37. Moreover, the host device 37 displays the correction information (for example, the correction factor and/or whether or not a correction has been made) on the display unit 39.

The above-described embodiment provides the following advantages.

(1) The feeder 18 wears down due to feeding of the documents D, thereby varying the frictional force between the feeder 18 and documents D, which may change the speed at which the documents D pass through the reader 24. However, the correction factor acquisition unit 43 acquires the correction factor based on the fed document number m of the documents D fed by the feeder 18, and the correction unit 44 corrects the image on the basis of the correction factor. Therefore, variations in the length of the image read by the reader 24 can be reduced.

(2) When the feeder 18 which is worn is replaced, the frictional force increases between the feeder 18 after the replacement and the documents D. However, the fed document number m is reset when the feeder 18 is replaced, which enables the correction factor acquisition unit 43 to acquire the correction factor according to the feeder 18 after the replacement.

(3) The correction factor acquisition unit 43 acquires the correction factor for each of the jobs, which enables the correction unit 44 to correct the image with the correction factor optimal for each job.

(4) Due to transport of the documents D, the transport roller 22 wears down and the diameter of the transport roller 22 decreases, which may reduce the transport distance per rotation of the transport roller 22. However, since the correction factor acquisition unit 43 acquires the correction factor also on the basis of the rotational number n of the transport roller 22, variations in the length of the image read by the reader 24 can be further reduced.

(5) Even when the image reading apparatuses 11 are image reading apparatuses of the same model, the speed at which documents D pass through the reader 24 may be different for each image reading apparatus 11 due to variations in components, assembly errors, etc. However, the correction factor acquisition unit 43 acquires the correction factor also on the basis of the specific adjustment value v which is specific to each image reading apparatus, and therefore, variations in the length of the image read by the reader 24 can be further reduced.

(6) The adjustment value acquisition unit 42 acquires the variable adjustment value u which is varied by, for example, a user. Then, the correction factor acquisition unit 43 acquires the correction factor also on the basis of the variable adjustment value u, and therefore, the length of the image read by the reader 24 can be adjusted.

(7) The output unit 45 outputs correction information, and therefore, for example, by displaying the correction information which is output on a display unit 39, it is possible to notify a user of whether or not the image has been corrected.

Note that the embodiment may be modified as described below.

In the embodiment, the correction unit 44 may correct the read image by any method. For example, the read image may be corrected by a nearest neighbor method, a bilinear method, a Lanczos method, or the like.

In the embodiment, the discharge roller 25 and the discharge driven roller 26 may be omitted.

In the embodiment, the output unit 45 does not have to output correction information. Moreover, for example, the image reading apparatus 11 may include a connection unit connectable to an external memory and/or a display unit for displaying information. The output unit 45 may output the corrected image and/or the correction information to the display unit included in the image reading apparatus 11 and/or the external memory.

In the embodiment, the correction factor acquisition unit 43 is required only to acquire the correction factor based on at least the fed document number m. That is, the correction factor acquisition unit 43 may acquire the correction factor without using the variable adjustment value u. Moreover, the correction factor acquisition unit 43 may acquire the correction factor without using the specific adjustment value v. Furthermore, the correction factor acquisition unit 43 may acquire the correction factor without using the rotational number n.

In the embodiment, the image reading apparatus 11 may be provided with an input unit, and by using the input unit included in the image reading apparatus 11, the variable adjustment value u may be set.

In the embodiment, the discharge driven roller 22 may be omitted. That is, the document D fed by the feeder 18 is transported by the feed roller 19 to the discharge roller 25 and may then be transported and discharged by the discharge roller 25. Moreover, the discharge roller 25 may be provided with the rotation detector 33 and the encoder scale 34, and the correction factor acquisition unit 43 may acquire the correction factor on the basis of the rotational number of the discharge roller 25.

In the embodiment, the discharge driven roller 22 may be replaceable. When the transport roller 22 is replaced, the rotational number n stored in the storage 41 may be reset.

In the embodiment, the correction unit 43 may acquire the correction factor at an arbitrary timing. For example, the correction unit 43 may acquire the correction factor at a timing at which the power supply of the image reading apparatus 11 is turned on. Moreover, the storage 41 also stores the correction factor, and the correction factor may be updated at a timing at which the power supply of the image reading apparatus 11 is turned off. Moreover, the correction factor acquisition unit 43 may acquire the correction factor each time a unit number of (for example, 100 sheets of) documents D are transported.

The embodiment may further include a replacement detector configured to detect whether the feeder 18 has been replaced, and the fed document number m stored in the storage 41 may be reset when the replacement detector detects replacement of the feeder 18.

In the embodiment, the feeder 18 does not have to be replaceable. Moreover, one of the feed roller 19 and the frictional force imparting unit 20 may be replaceable. When at least the frictional force imparting unit 20 is replaced, the fed document number m may be reset.

In the embodiment, the frictional force imparting unit 20 may be a separating pad configured to separate the documents D from each other by sandwiching each document D between the feed roller 19 and the frictional force imparting unit 20.

In the embodiment, the image reading apparatus 11 is not limited to a sheet-feed image reading apparatus but may be a flat-bed image reading apparatus including an automatic document feeding apparatus (automatic sheet feeder) configured to automatically feed the documents D. Moreover, the image reading apparatus 11 may be applied to a multi-function device configured integrally with a printing apparatus, a facsimile device having a communication function, and the like.

The entire disclosure of Japanese Patent Application No. 2016-107082, filed May 30, 2016 is expressly incorporated by reference herein.

What is claimed is:

1. An image reading apparatus comprising:
    a feeder configured to feed documents while providing frictional force in a direction opposite to a transport direction from a mount unit on which the documents are mounted toward a transport path;
    a storage configured to store a fed document number of the documents fed by the feeder;
    a reader configured to read an image of each of the documents transported in the transport path from an upstream side to a downstream side in the transport direction;
    a correction factor acquisition unit configured to acquire, based on the fed document number, a correction factor for correcting a read image read by the reader; and
    a correction unit configured to correct a length of the read image in the transport direction on the basis of the correction factor.

2. The image reading apparatus according to claim 1, wherein
    the fed document number stored in the storage is reset when the feeder is replaced.

3. The image reading apparatus according to claim 1, wherein
    the correction factor acquisition unit acquires the correction factor for each of jobs.

4. The image reading apparatus according to claim 1, further comprising:
    a transport roller configured to transport the documents fed by the feeder from the upstream side to the downstream side in the transport direction, wherein
    the storage further stores a rotational number of the transport roller, and
    the correction factor acquisition unit acquires the correction factor also on the basis of the rotational number.

5. The image reading apparatus according to claim 1, wherein
    the storage further stores a specific adjustment value which is specific to the image reading apparatus, and
    the correction factor acquisition unit acquires the correction factor also on the basis of the specific adjustment value.

6. The image reading apparatus according to claim 1, further comprising:
    an adjustment value acquisition unit configured to acquire a variable adjustment value which is variable, wherein
    the correction factor acquisition unit acquires the correction factor also on the basis of the variable adjustment value.

7. The image reading apparatus according to claim 1, further comprising:

an output unit configured to output correction information based on the correction factor.

8. The image reading apparatus according to claim 1, wherein
the feeder includes a feed roller and a separating roller.

9. An image correcting method of an image reading apparatus including: a feeder configured to feed documents while providing frictional force in a direction opposite to a transport direction from a mount unit on which the documents are mounted toward a transport path; and a reader configured to read an image of each of the documents transported in the transport path from an upstream side to a downstream side in the transport direction, the image correcting method comprising:
causing the feeder to feed the documents;
storing a fed document number of the documents which are fed;
causing the reader to read the image of each of the documents;
acquiring, based on the fed document number, a correction factor for correcting a read image read by the reader; and
correcting a length of the read image in the transport direction on the basis of the correction factor.

* * * * *